United States Patent [19]

Lukach et al.

[11] Patent Number: 4,523,010

[45] Date of Patent: Jun. 11, 1985

[54] DIHYDROXYPROPYL MIXED ETHER DERIVATIVES OF CELLULOSE

[75] Inventors: Carl Lukach, New Castle County, Del.; Thomas G. Majewicz, Chadds Ford, Pa.; Albert R. Reid, New Castle County, Del.

[73] Assignee: Hercules Incorporated, Wilmington, Del.

[21] Appl. No.: 621,328

[22] Filed: Jun. 15, 1984

[51] Int. Cl.$^3$ .............................................. C08B 11/193
[52] U.S. Cl. ...................................... 536/91; 106/170; 536/95; 252/8.55 R
[58] Field of Search ...................... 536/91, 95; 106/170

[56] References Cited

U.S. PATENT DOCUMENTS

| | | | |
|---|---|---|---|
| 3,839,319 | 10/1974 | Greminger et al. | 106/170 |
| 4,001,210 | 1/1977 | Engelskirchen et al. | 536/95 |
| 4,013,821 | 3/1977 | Engelskirchen et al. | 536/88 |
| 4,096,326 | 6/1976 | Reid | 536/95 |
| 4,228,277 | 10/1980 | Landoll | 536/91 |
| 4,400,502 | 8/1983 | Majewicz | 536/91 |

Primary Examiner—Ronald W. Griffin
Attorney, Agent, or Firm—Joanne L. Horn

[57] ABSTRACT

Disclosed are nonionic dihydroxypropyl hydroxyalkylcelluloses having a dihydroxypropyl M.S. of from about 0.1 to 1.2 and a hydroxyalkyl M.S. of from about 1.5 to about 3.0. The dihydroxypropyl hydroxyalkylcelluloses are capable of reacting with polyvalent metal cations, such as, titanium and zirconium, in an aqueous medium, such as a salt brine medium, to form viscoelastic gels useful in oil recovery operations.

8 Claims, No Drawings

DIHYDROXYPROPYL MIXED ETHER DERIVATIVES OF CELLULOSE

This invention relates to a nonionic dihydroxypropyl hydroxyalkylcelluloses which will complex or crosslink in an aqueous medium, such as a salt brine medium, with polyvalent metal cations, such as zirconium and titanium, in the form of metal salts or chelates to provide stable viscoelastic gels.

Crosslinked polymer gels are commonly used in petroleum recovery operations, particularly in hydraulic fracturing. For example, metal ion crosslinkable cellulose ethers have been prepared by the alkylation of hydroxyethylcellulose to provide a mixed cellulose ether derivative having an anionic functionality, such as carboxylic acid groups (see U.S. Pat. No. 4,035,195 to Podlas) and phosphoric acid groups (see U.S. Pat. No. 4,396,433 to Brandt et al.). At the present time, the only polyvalent metal ion crosslinkable anionic cellulose ether used in hydraulic fracturing operations is carboxymethyl hydroxyethylcellulose. C However, such anionic mixed cellulose ethers are susceptible to degradation by acid catalyzed hydrolysis. Unfortunately, the optimum crosslinking of these anionic cellulose ethers by polyvalent metal ions occurs in acidic media, which is usually at a pH of less than 5. Hence, the viscoelastic gels formed by the crosslinking of these anionic cellulose ethers with polyvalent metal ions are less stable than gels prepared from polymers which are optimally gelled at a neutral or weakly alkaline pH.

In addition, such anionic cellulose ethers can react readily with dissolved iron ions when stored in steel tanks, which is how such ether solutions are commonly stored. This reaction with the iron ions leads to premature gelation or precipitation in these steel storage tanks.

Furthermore, anionic cellulose ethers are not as compatable with salt brine systems as nonionic cellulose ethers.

Dihydroxypropyl hydroxyalkylcellulose ethers having at least about 1.4 dihydroxypropyl units per anhydroglucose unit, and the complexing thereof with borate or antimonate compounds are disclosed in U.S. Pat. No. 4,096,326 to Reid.

Dihydroxypropyl hydroxyalkylcellulose ethers having less than 1.4 dihydroxypropyl units per anhydroglucose unit have now been found which have low sensitivity to iron contamination, crosslinks efficiently and effectively with the polyvalent metal cations commonly used in preparing viscoelastic gels for use in hydraulic fracturing, i.e., titanium and zirconium, and optimally crosslinks with polyvalent metal cations in the pH range of 6 to about 9. The viscoelastic gels prepared with the cellulose ethers of this invention have a low insoluble residue and are an excellent medium for suspending particulate matter.

In accordance with this present invention, a nonionic, crosslinkable dihydroxypropyl hydroxyalkylcellulose ether is prepared having a dihydroxypropyl molecular substitution (M.S.) from about 0.1 to about 1.2 and a hydroxyalkyl M.S. of from about 1.5 to about 3.0. Preferably the dihydroxypropyl M.S. is from about 0.5 to about 1.0 and the hydroxyalkyl M.S. is from about 2.0 to about 2.5. M.S. is defined as the average number of moles of a substituent group or substituent groups present per anhydroglucose unit of the cellulose material.

The dihydroxypropyl hydroxyalkylcellulose ether of this invention is prepared by reacting 3-chloro-1,2-propanediol or glycidol with a hydroxyalkylcellulose furnish having a hydroxyalkyl M.S. from about 1.5 to about 3.0. Typical hydroxyalkylcellulose furnishes include hydroxyethylcellulose and hydroxypropylcellulose.

Preferably the reagent is reacted with a preformed hydroxyalkyl cellulose regardless of whether the hydroxyalkylcellulose is formed in a separate reaction or formed in situ. The hydroxyalkylcelluloses can be formed by reacting the appropriate alkylene oxide reagent with cellulose in an aqueous caustic media by methods known in the art. (See, e.g., Whistler, R. L. & BeMiller, J. N., *Industrial Gums*, p. 650 (2 ed. 1973).

Any cellulose furnish can be used to prepare the hydroxyalkylcellulose, such as chemical cotton, cotton linters, or wood pulp. The cellulosic material may be bulk dried, sheet dried, pretreated with alkali, or otherwise prepared for reduction to particles sufficiently small to permit reaction thereon by the reactants. The cellulosic material can be ground in an attrition mill or similar device to fine particles, or it can be shredded, fluffed or otherwise treated.

The technical grades of the 3-chloro-1,2-propanediol and glycidol contain impurities which are capable of crosslinking the hydroxyalkylcellulose under etherification reaction conditions. Hence, these etherification reagents must be purified by low temperature, high vacuum distillation prior to a use in the preparation of the dihydroxypropyl hydroxyalkylcellulose ethers of this invention. Specifically, the purity of the 3-chloro-1,2-propanediol must be such that the reagent has a refractive index of about 1.47715 to 1.47720 at 30° C., and the purity of the glycidol must be such that it has a refractive index of about 1.43090.

The etherification is preferably carried out via the slurry technique described in U.S. Pat. No. 2,517,577 to Klug et al. or U.S. Pat. No. 2,572,039 to Klug et al. Briefly this technique involves reacting a hydroxyalkylcellulosic furnish in the presence of an alkali in a sufficient volume of a secondary or tertiary alcohol to maintain the hydroxyalkylcellulose furnish and the product in the suspended state throughout the entire reaction time.

Suitable solvents for use in the preparation of the dihydroxypropyl hydroxalkylcellulose ethers of this invention include t-butyl alcohol and isopropanol.

Typically, the ratio of solvent to cellulose is between about 5 to about 15 parts of solvent per part of cellulose, preferably between about 8 and about 12 parts of solvent per part of cellulose.

The ratio of solvent to hydroxyalkyl cellulose generally is between about 4 to about 12 parts solvent per part of hydroxyalkyl cellulose, preferably between about 6 and about 9 parts solvent per part hydroxyalkyl cellulose.

The alkali present in the reaction mixture is usually sodium hydroxide. However, any of the strong alkali hydroxides are suitable, including potassium hydroxide. Any amount of alkali can be used in the process of the present invention as long as it is present in an amount sufficient to react with the 3-chloro-1,2-propanediol reagent, and to catalyze the reaction. When glycidol is the reagent, the alkali is present in an amount sufficient to catalyze the reaction. The water content of the reaction mixture should be sufficient to swell the hydroxyalkylcellulose.

The amount of dihydroxypropylating reagent used is dependent on the desired M.S. and the reaction conditions. Concentrations of sodium hydroxide and water, as well as other reaction variables such as the diluent, reaction time/temperature, agitation have an affect on the dihydroxypropylation reaction efficiency with the hydroxyalkyl cellulose. Under typical conditions, as exemplified in examples 1–3, the dihydroxypropylation reaction efficiency will be about 40 to about 50%. To obtain an M.S. of from about 0.1 to about 1.2, under typical reaction conditions, from about 0.2 to about 3.0 moles of the dihydroxypropylating reagent per mole of cellulose or hydroxyalkyl cellulose is generally used. Preferably, from about 0.2 moles to about 2.4 moles of the dihydroxypropylating reagent per mole of cellulose or hydroxyalkyl cellulose is used.

Typically, a 1% aqueous solution, by weight of the hydroxyalkylcellulose, of the dihydroxypropyl hydroxyalkylcellulose of this invention has a Brookfield viscosity of from about 1500 centipoise (cps) to about 5000 cps at 25° C. (30 rpm, No. 3 or 4 spindle).

The following examples illustrate various aspects of this invention. Modifications of the specific dihydroxypropyl hydroxyalkylcellulose ethers and procedures of these examples can be made without departing from the spirit and scope of this invention.

All parts and percentages used in this specification are by weight of the cellulose unless otherwise specified.

EXAMPLE 1

This example illustrates a preferred specific embodiment of the dihydroxypropyl hydroxyalkylcellulose ether of this invention, and how to prepare it.

A stirred autoclave is charged with 500 ml isopropanol; 54.0 g, dry weight, of hydroxyethylcellulose (HEC) having a hydroxyethyl M.S. of 2.1; and a solution of 5.0 g sodium hydroxide and 50 ml water. The resulting slurry is mixed for one hour under nitrogen and 45.0 g glycidol dissolved in 25 ml isopropanol is added. The mixture is then heated under nitrogen for one hour at 45° C. and for another hour at 80° C. Upon cooling, the mixture is neutralized, purified in aqueous acetone and dried. The product has a 1% Brookfield viscosity of 1700 cps (at 30 rpm), a dihydroxypropyl M.S. of 1.2, and a hydroxyethyl M.S. of 2.1.

EXAMPLE 2

This example illustrates another embodiment of this invention, and how to prepare it.

A stirred autoclave is charged with 32.4 g cotton linters cellulose, 33.1 g ethylene oxide in a solution of 400 ml tert-butanol, 11.0 g sodium hydroxide and 52 ml water. The mixture is heated at 80° C. for 1 hour. The reaction mixture is cooled, and 15.0 g glycidol dissolved in 15 ml tert-butanol is added to the autoclave. The slurry is heated to 80° C. for one hour. The reaction mixture is then cooled and neutralized. The product is purified in aqueous acetone and dried. The product has a 1% Brookfield viscosity of about 3300 cps (at 30 rpm), and a hydroxyethyl M.S. of 2.5 and a dihydroxypropyl M.S. of 0.5.

EXAMPLE 3

This example illustrates another embodiment of this invention.

The dihydroxypropyl hydroxyethylcellulose ether is prepared according to the procedure and the formulation of Example 2 except that 8.0 g of glycidol is added instead of 15.0 g. The product has a 1% Brookfield viscosity of about 4800 cps (at 30 rpm), and a dihydroxypropyl M.S. of 0.25.

As stated herein before, carboxymethyl hydroxyethylcellulose (CMHEC) is the cellulose ether commonly used in hydraulic fracturing operations. The effect of various multivalent metal salts or chelates on the viscosity of 0.25% aqueous solutions of CMHEC having a carboxymethyl D.S. of 0.4 and a hydroxyethyl M.S. of 2.0, which is the particular CMHEC commonly used in hydraulic fracturing applications, is set forth in Table 1 below.

For each control, four 100 ml solutions of 0.25% CMHEC in distilled water are prepared. The pH of each CMHEC solution is reduced to 2.0 with HCl. The metal salts or metal chelates are dissolved in distilled water to concentrations of 1.0%, by weight, or 0.05 molar crosslinker solutions. Sufficient crosslinker solution is then added to each CMHEC solution, under agitation, until the concentration level indicated in Table I for each control solution is obtained. The pH of the four CMHEC solutions for each control is then raised, one to pH 3, one to pH 5, one to pH 7 and one to pH 9, with a dilute sodium hydroxide solution. Each solution is then allowed to stand for 30 minutes, and then the viscosity is taken on a Brookfield LVT viscometer at 25° C. (30 rpm).

TABLE I

| CMHEC Control No. | Metal Salt or Chelate | Concentration of Metal Salt or Chelate, Wt. %[a] | Brookfield Viscosity, cps.[b] | | | |
|---|---|---|---|---|---|---|
| | | | pH 3 | pH 5 | pH 7 | pH 9 |
| 1 | None | 0 | 20 | 30 | 35 | 40 |
| 2 | Ferric Nitrate | 24.2 | ppt. | ppt.[c] | 344 | 242 |
| 3 | Ferric Acetylacetonate | 5.0 | 2088 | 102 | 40 | 37 |
| 4 | Ferric Acetylacetonate | 25.0 | 375 | 6660 | 77 | 38 |
| 5 | Chromium Nitrate | 23.8 | 91 | 5200 | 3120 | 30 |
| 6 | Titanium Acetylacetonate | 25.0 | 90 | 4180 | 43 | 37 |
| 7 | Titanium Lactic Acid Chelate[d] | 29.4 | 200 | 134 | 23 | 22 |
| 8 | Zirconium Acetylacetonate | 5.0 | 524 | 2460 | 45 | 42 |
| 9 | Zirconium Acetylacetonate | 25.0 | 72 | 9580 | 49 | 43 |
| 10 | Basic Aluminum Acetate[e] | 4.0 | 343 | 520 | 64 | 40 |

[a]Based on CMHEC.
[b]0.25% aqueous solution at 25° C. (30 rpm) taken 30 minutes after the addition of the metal salt or metal chelate.
[c]Heterogeneous mixture consisting of precipitate and globular gels dispersed in a thickened solution.
[d]Marketed under the trademark Tyzor by E. I. du Pont de Nemours &Co.
[e]Marketed under the trademark Niaproof by Niacet Corp.

The data in Table I shows that CMHEC interacts with polyvalent cation species most strongly in the acidic pH range of 3–5 and that, except for iron and chromium, little interaction occurs in the desirable 7–9 pH range. Furthermore, the data in Table I bears out the very strong and rapid complexation with the iron cation species, especially in the pH 3-5 range, where CMHEC optimally interacts with other polyvalent metal cation species. It is clear, therefore, that the optimum crosslinking of CMHEC with polyvalent cation species occurs under the same pH conditions, i.e., pH 3-5, in which the strong interaction with the iron cation species occur. Hence, iron contamination potentially could lead to premature gelation or precipitation.

The effect of various polyvalent metal salts or metal chelates on the viscosity of 0.25% aqueous solutions of the dihydroxypropyl hydroxyethyl cellulose (DHPHEC) of Examples 1-3 is shown in Table II. The aqueous solutions are prepared and the viscosity measurements are conducted in the same manner as set forth for control nos. 1-10 in Table I.

The effect of crosslinking 0.5% CMHEC or DHPHEC in 2% KCl solutions buffered at pH 7.5-8.5 with sodium bicarbonate/acetic acid is set forth in Table III. Each polymer solution is prepared using 100 ml distilled water containing 2.0 g KCl, 0.15 g sodium bicarbonate and 0.02 g acetic acid, and 0.5 g of the particular cellulose polymer. Crosslinker solutions having the concentration listed in Table III are prepared according to the procedure for such solutions set forth above for control nos. 1-10 in Table I. The pH of each solution is adjusted to between 7.5-8.5 with a dilute sodium hydroxide solution. Sufficient crosslinker solution is then added to each polymer solution, under agitation, until the concentration level indicated in Table III is obtained. These solutions or gels are allowed to stand for 24 hours, and the nature of the solutions or gels are observed and recorded. Under these conditions, no

TABLE II

| DHPHEC Example No. | Metal Salt or Chelate | Concentration of Metal Salt or Chelate, Wt. %[a] | Brookfield Viscosity, cps.[b] | | | |
|---|---|---|---|---|---|---|
| | | | pH 3 | pH 5 | pH 7 | pH 9 |
| 1 | None | 0 | 15 | 15 | 15 | 15 |
| 2 | None | 0 | 40 | 40 | 40 | 40 |
| 3 | None | 0 | 50 | 50 | 50 | 50 |
| 1 | Ferric Nitrate | 24.2 | 20 | 155 | 43 | 62 |
| 2 | Ferric Nitrate | 24.2 | 39 | 246 | 56 | 115 |
| 3 | Ferric Nitrate | 24.2 | 40 | 129 | 47 | 55 |
| 2 | Ferric Acetylacetonate | 25.0 | 37 | 39 | 38 | 40 |
| 3 | Ferric Acetylacetonate | 25.0 | 50 | 51 | 50 | 49 |
| 1 | Titanium Lactic Acid Chelate[c] | 29.4 | — | 18 | 513 | 370 |
| 2 | Titanium Lactic Acid Chelate | 29.4 | 39 | 38 | 53 | 544 |
| 3 | Titanium Lactic Acid Chelate | 29.4 | 41 | 41 | 57 | 3248 |
| 2 | Titanium Acetylacetonate | 25.0 | 50 | 373 | 62 | 267 |
| 3 | Titanium Acetylacetonate | 25.0 | 53 | 159 | 48 | 64 |
| 2 | Zirconium Acetylacetonate | 5.0 | 201 | 256 | 1636 | 204 |
| 3 | Zirconium Acetylacetonate | 5.0 | 63 | 142 | 1060 | 362 |
| 2 | Zirconium Acetylacetonate | 25.0 | 50 | 722 | 6680 | 1424 |
| 3 | Zirconium Acetylacetonate | 25.0 | 51 | 58 | 1956 | 4340 |
| 1 | Chromium Nitrate | 23.8 | 15 | 16 | 17 | 18 |
| 2 | Basic Aluminum Acetate[d] | 20.0 | 35 | 35 | 39 | 39 |

[a]Based on DHPHEC.
[b]0.25% aqueous solution at 25° C. (30 rpm) taken 30 minutes after the addition of the metal salt or metal chelate.
[c]Marketed under the trademark Tyzor by E. I. du Pont de Nemours & Co.
[d]Marketed under the trademark Niaproof by Niacet Corp.

The data in Table II shows the greater selectivity of DHPHEC over CMHEC with respect to crosslinking with polyvalent cation species. DHPHEC does not interact with the chromium or aluminum cation species like CMHEC, and reacts only slightly or not at all with iron cation species, especially in the pH range of 7-9, particularly at pH 7, where interaction with species such as titanium or zirconium is optimal. Thus, it is clear that DHPHEC is optimally crosslinked with specific polyvalent metal ion species, in the desired pH range of 7-9, with little or no interference from any iron contamination.

gelation was observed from CMHEC in the presence of up to 25% by weight zirconium or titanium acetylacetonate.

TABLE III

| Cellulose Ether | Metal Chelate | Concentration of Metal Chelate, Wt. (%)[a] | Nature of Crosslinked Gel |
|---|---|---|---|
| Control[b] | Zirconium Acetylacetonate | 5.0 | No gelation |
| Control[b] | Zirconium Acetylacetonate | 25.0 | No gelation |
| Example 2 | Zirconium Acetylacetonate | 5.0 | Stable weak gel |
| Example 2 | Zirconium Acetylacetonate | 25.0 | Stable firm gel |
| Example 3 | Zirconium Acetylacetonate | 5.0 | Stable weak gel |
| Example 3 | Zirconium Acetylacetonate | 25.0 | Stable soft gel |
| Control[b] | Titanium Acetylacetonate | 5.0 | No gelation |
| Example 1 | Titanium Acetylacetonate | 5.0 | Stable firm gel |
| Example 2 | Titanium Acetylacetonate | 5.0 | Stable weak gel |
| Example 3 | Titanium Acetylacetonate | 5.0 | Increase in viscosity |

[a]Based on particular cellulose ether used.
[b]CMHEC having a carboxymethyl D.S. of 0.4 and a hydroxyethyl M.S. of 2.0.

Hence, this invention provides dihydroxypropyl hydroxyalkylcelluloses which are capable of crosslinking efficiently and effectively with polyvalent metal cations to form stable viscoelastic gels useful in oil recovery operations.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What we claim and desire to receive by Letters Patent is:

1. A nonionic, crosslinkable material consisting essentially of dihydroxypropyl hydroxyalkylcellulose having a dihydroxypropyl M.S. of from about 0.1 to 1.2 and a hydroxyalkyl M.S. of from about 1.5 to about 3.0.

2. The material of claim 1 wherein the dihydroxypropyl M.S. is from about 0.5 to about 1.0 and the hydroxyalkyl M.S. is from about 2.0 to about 2.5.

3. A gel-forming composition consisting essentially of the material of claim 1 and a polyvalent metal cation selected from the group consisting of titanium and zirconium in an aqueous medium.

4. The composition of claim 3 wherein the polyvalent metal cation is in a form selected from the group consisting of a metal salt and a metal chelate.

5. A gel-forming composition consisting essentially of the material of claim 2 and a polyvalent metal cation selected from the group consisting of titanium and zirconium in an aqueous medium.

6. The composition of claim 5 wherein the polyvalent metal cation is in a form selected from the group consisting of a metal salt and a metal chelate.

7. A nonionic, crosslinkable material consisting essentially of dihydroxypropyl hydroxyethyl cellulose having a dihydroxypropyl M.S. of from about 0.1 to 1.2 and hydroxyethyl M.S. of from about 1.5 to about 3.0.

8. The material of claim 7 wherein the dihydroxypropyl M.S. is from about 0.5 to about 1.0 and the hydroxyethyl M.S. is from about 2.0 to about 2.5.

* * * * *